(12) United States Patent
Lundman

(10) Patent No.: US 6,959,734 B2
(45) Date of Patent: Nov. 1, 2005

(54) FLOW-THROUGH INFLATABLE PLUG

(76) Inventor: Philip L. Lundman, 3631 Fredonia Kohler Dr., Fredonia, WI (US) 53021

( * ) Notice: Subject to any disclaimer, the term of this patent is extended or adjusted under 35 U.S.C. 154(b) by 0 days.

(21) Appl. No.: 10/319,181

(22) Filed: Dec. 13, 2002

(65) Prior Publication Data

US 2004/0112451 A1    Jun. 17, 2004

(51) Int. Cl.[7] ............................................. F16L 55/12
(52) U.S. Cl. ...................... 138/93; 251/61.1; 137/599; 137/240
(58) Field of Search ................. 138/93, 90, 91; 251/61.1; 137/240, 599

(56) References Cited

U.S. PATENT DOCUMENTS

| | | | |
|---|---|---|---|
| 1,760,750 A * | 5/1930 | Goodman | 138/93 |
| 3,618,639 A * | 11/1971 | Daley et al. | 138/97 |
| 3,946,761 A * | 3/1976 | Thompson et al. | 138/98 |
| 4,160,464 A * | 7/1979 | Ballinger | 138/93 |
| 4,413,655 A * | 11/1983 | Brown | 138/97 |
| 4,565,222 A | 1/1986 | Lundman | |
| 4,646,787 A * | 3/1987 | Rush et al. | 138/98 |
| 4,883,094 A * | 11/1989 | Vetter | 138/89 |
| 5,353,842 A | 10/1994 | Lundman | |
| 5,379,802 A * | 1/1995 | VanderLans | 138/89 |
| 5,546,991 A * | 8/1996 | Mathison et al. | 138/93 |
| 5,643,386 A * | 7/1997 | Mathison et al. | 156/218 |
| 5,901,752 A | 5/1999 | Lundman | |
| 5,934,311 A * | 8/1999 | Brown | 137/240 |
| 5,996,621 A * | 12/1999 | Hagiwara et al. | 137/565.33 |
| 6,446,669 B1 | 9/2002 | Lundman | |
| 6,691,786 B2 * | 2/2004 | Patel | 166/375 |
| 2004/0003855 A1 * | 1/2004 | Dees et al. | 138/93 |

* cited by examiner

Primary Examiner—James Hook
(74) Attorney, Agent, or Firm—Michael Best & Friedrich LLP

(57) ABSTRACT

A flow-through inflatable plug assembly inflatable in a pipeline. The flow-through inflatable plug assembly includes a flow-through fluid conduit and a separate "donut-shaped" inflatable member having an aperture defined therein. For operation, the flow-through fluid conduit is inserted into the aperture of the inflatable member. When the flow-through inflatable plug assembly is inflated in a pipeline, the inflatable member fills the void between the inner diameter of the pipeline and the outer diameter of the flow-through fluid conduit. Thus, the flow-through fluid conduit is sealingly captured in the aperture such that fluid flow in the pipeline is limited to passage through the flow-through fluid conduit.

2 Claims, 4 Drawing Sheets

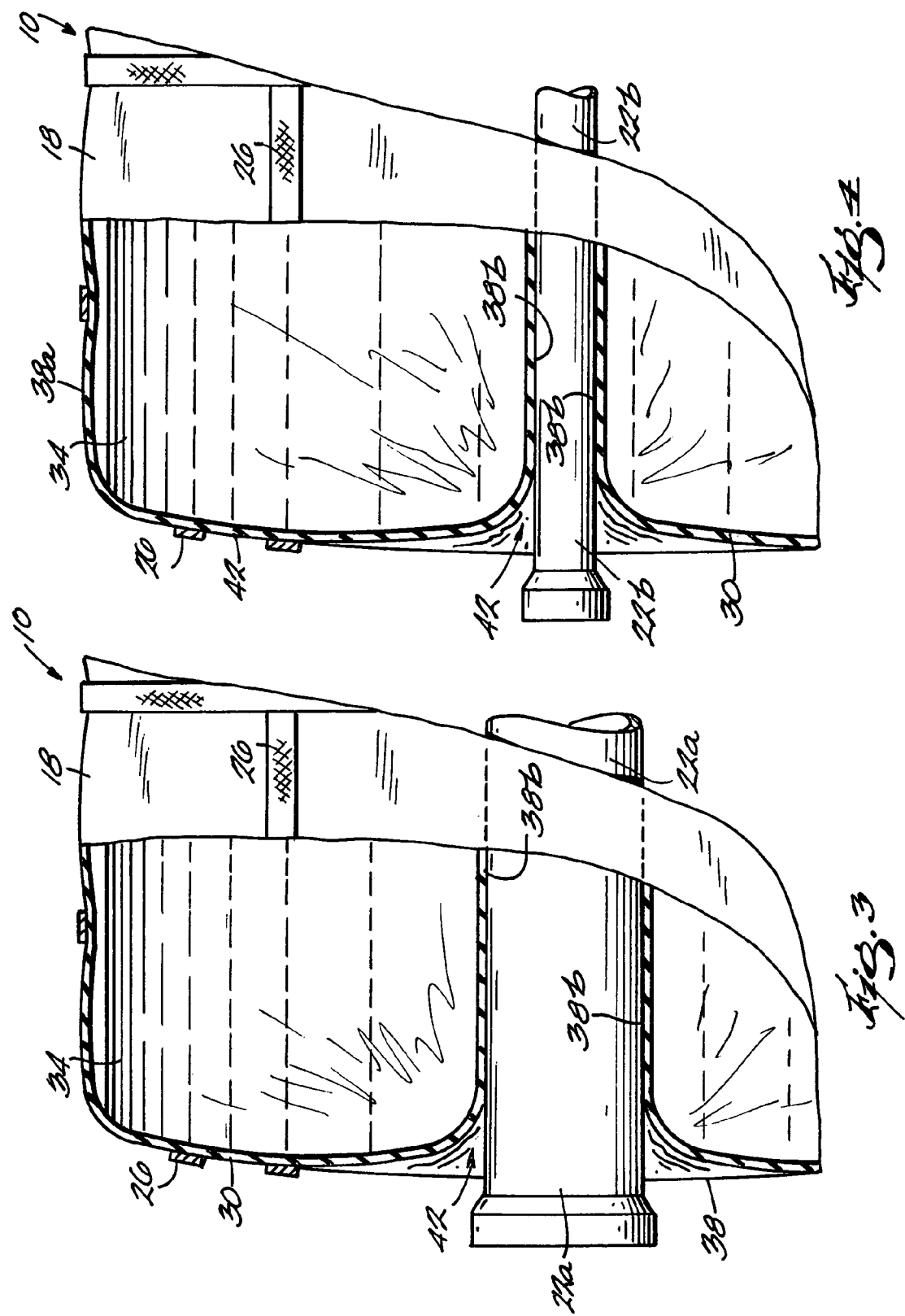

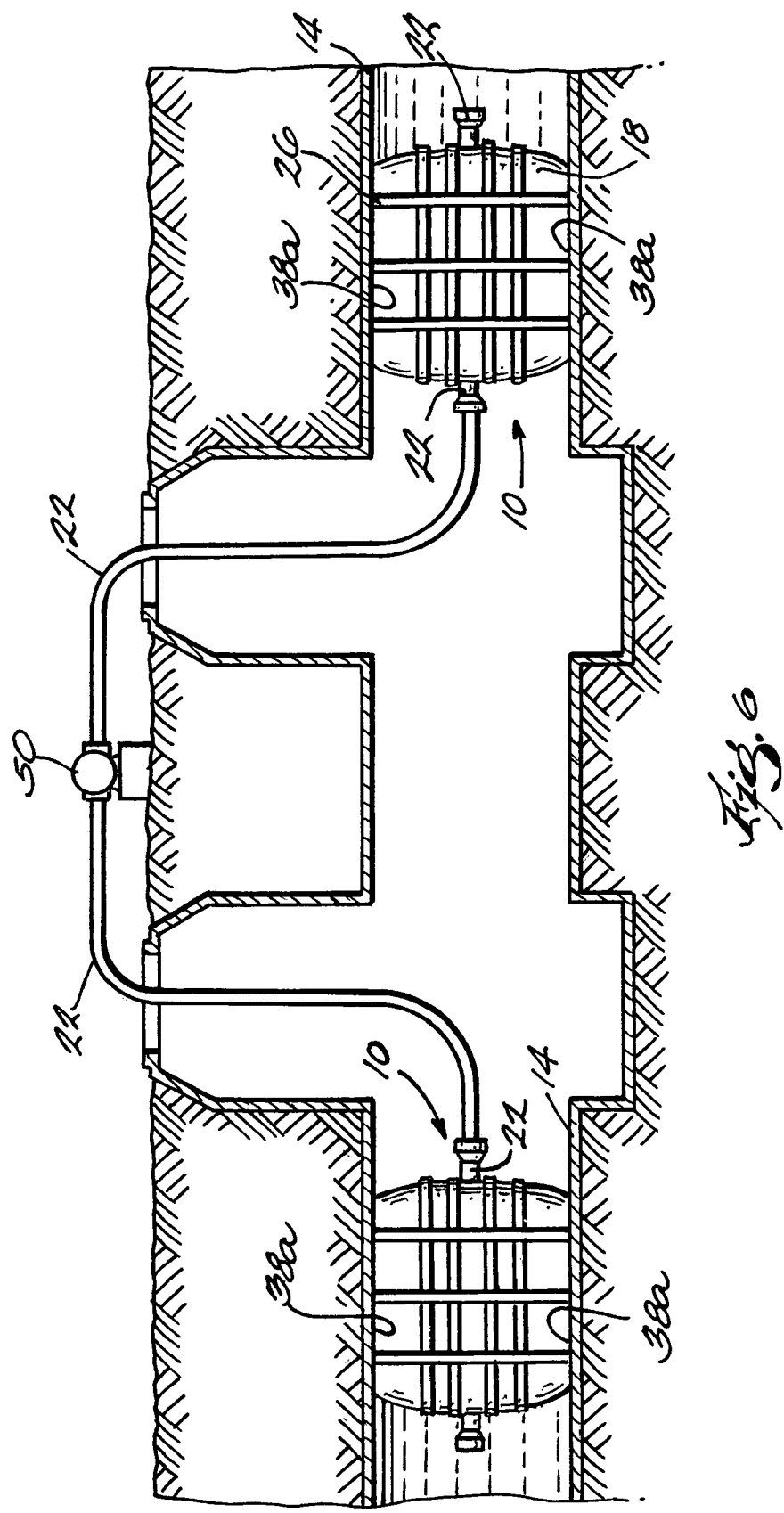

FLOW-THROUGH INFLATABLE PLUG

BACKGROUND OF THE INVENTION

The invention relates to a flow-through inflatable plug that is insertable in pipelines of varying diameters and inflatable therein.

Various flow-through inflatable plugs have been used in the past to redirect the flow of fluid through a pipeline for performing repair or maintenance on the pipeline. Nevertheless, an improved flow-through inflatable plug assembly that provides enhanced performance, ease of use, and reduced costs would be welcomed by those in the art.

SUMMARY OF THE INVENTION

The present invention provides a flow-through inflatable plug assembly. The flow-through inflatable plug assembly includes a flow-through fluid conduit and an inflatable member having an aperture defined therein. For operation, the flow-through fluid conduit is inserted into the aperture of the inflatable member. When the flow-through inflatable plug assembly is operatively inflated in a pipeline, the inflatable member fills the void between the inner diameter of the pipeline and the outer diameter of the flow-through fluid conduit. Thus, the flow-through fluid conduit is sealingly captured in the aperture such that fluid flow in the pipeline is limited to passage through the flow-through fluid conduit.

In one embodiment, the invention provides a flow-through inflatable plug assembly that is insertable in a pipeline for redirecting the flow of fluid through the pipeline. The flow-through inflatable plug assembly includes an inflatable member having an inflated condition and a deflated condition. The inflatable member includes an outside surface having a first portion and a second portion. The first portion defines an aperture extending through the inflatable member which is adapted to receive at least a portion of a conduit. When in the inflated condition, the second portion sealingly engages an outside diameter of the pipeline and the first portion sealingly engages an outside diameter of the conduit such that the flow of fluid through the pipeline is redirected through the conduit.

In another embodiment, the invention provides a method of redirecting the flow of fluid through a pipeline. The method includes providing a conduit and an inflatable member. The inflatable member has an inflated condition and a deflated condition. The inflatable member includes an outside surface having a first portion and a second portion, the first portion defining an aperture extending through the inflatable member. The method also includes inserting the conduit within the first portion, inserting the inflatable member in the pipeline, inserting at least a portion of the conduit in the pipeline, inflating the inflatable member such that the first portion sealingly engages at least a portion of the conduit and the second portion sealingly engages an inside diameter of the pipeline, and redirecting the flow of fluid through the conduit.

In yet another embodiment, the invention provides a flow-through inflatable plug assembly insertable into a pipeline and inflatable therein to redirect the flow of fluid through the pipeline, the pipeline having an inner diameter. The flow-through inflatable plug includes an inflatable member and a conduit. The inflatable member includes an outer surface having a first portion defining an aperture through the inflatable member and a second portion sealingly engaging the inner diameter of the pipeline when the inflatable member is operatively inflated in the pipeline such that the flow of fluid through the pipeline is directed towards the aperture. The conduit includes an outer diameter that is smaller than the inner diameter of the pipeline. The first portion sealingly engages the conduit when the inflatable member is operatively inflated in the pipeline such that the flow of fluid through the pipeline travels through the conduit.

Further objects of the present invention together with the organization and manner of operation thereof, will become apparent from the following detailed description of the invention when taken in conjunction with the accompanying drawings wherein like elements have like numerals throughout the drawings.

BRIEF DESCRIPTION OF THE DRAWINGS

FIG. 3 is a partial sectional view of the flow-through inflatable plug assembly illustrated in FIG. 1 taken along line 3—3, illustrating a flow-through fluid conduit.

FIG. 4 is a view similar to FIG. 3, showing the flow-through inflatable plug assembly with a flow-through fluid conduit having a smaller diameter.

FIG. 6 is a view similar to FIG. 5, showing a fluid pump assisting the redirected flow of fluid through the section of pipeline.

Figure 1:
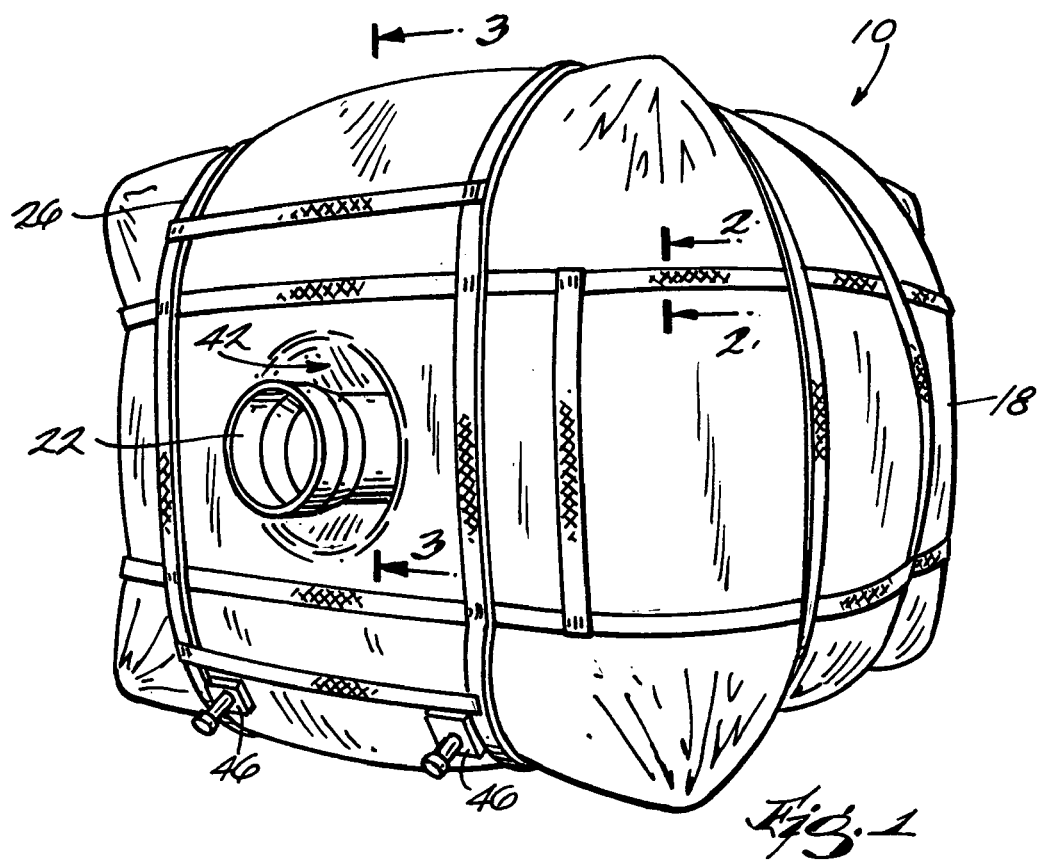
FIG. 1 is a perspective view of a flow-through inflatable plug assembly constructed in accordance with one embodiment of the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," and "coupled" are used broadly and encompass both direct and indirect mountings, connections, and couplings. Further, "connected" and "coupled" are not restricted to physical or mechanical connections or couplings. Additionally, the term "diameter" encompasses the width of a line segment passing though the center of a figure, whether the figure is circular or not, and the terms "sealingly engage" and "sealingly capture" encompass an interface between two surfaces where the interface substantially prevents the flow of fluid through the interface.

DETAILED DESCRIPTION OF THE PREFERRED EMBODIMENTS

Figure 5:
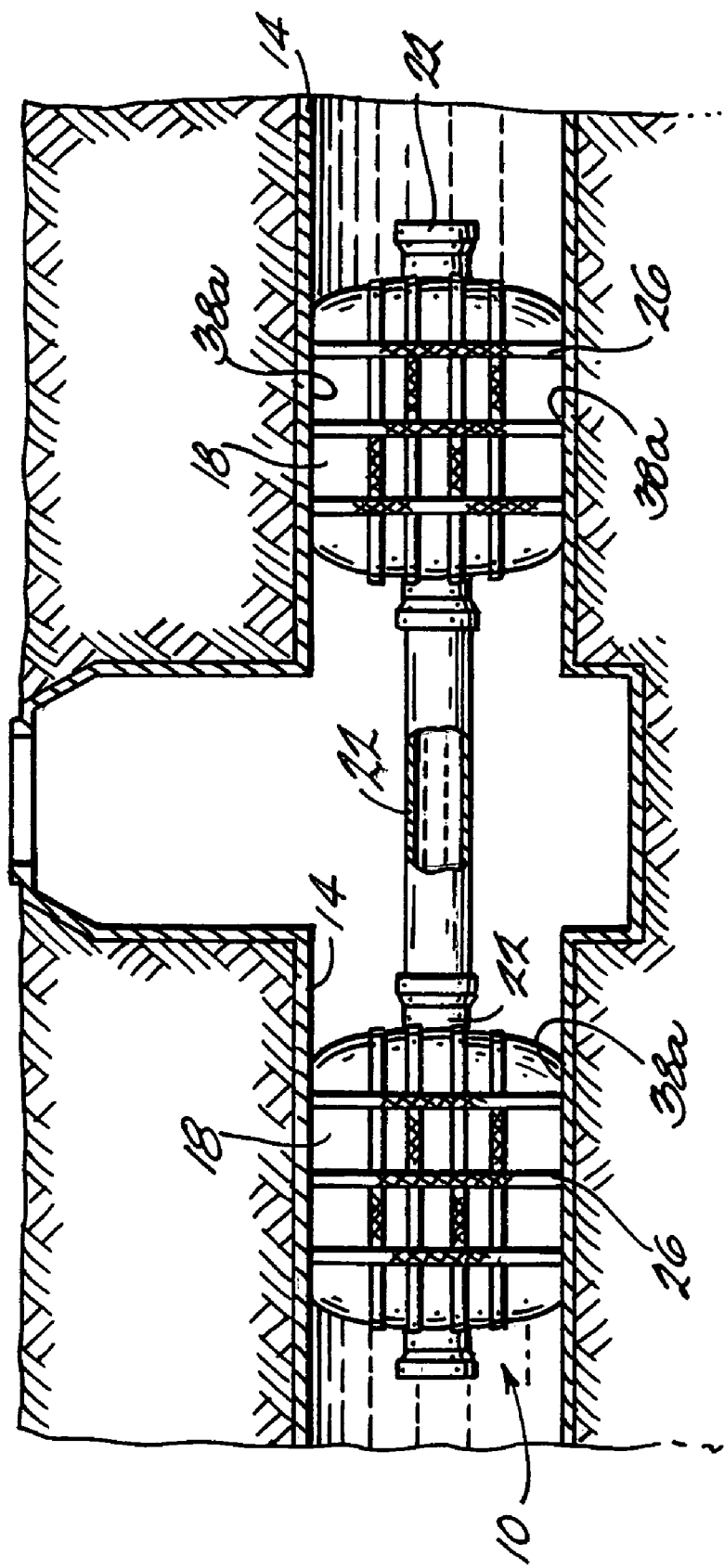
FIG. 5 is a sectional elevation view of a pipeline showing two of the flow-through inflatable plug assemblies illustrated in FIG. 1 acting in combination to isolate a section of the pipeline.

FIG. 1 illustrates a flow-through inflatable plug assembly 10 according to one embodiment of the present invention. The inflatable plug assembly 10 is for use in performing repair or maintenance on a pipe or pipeline 14 (FIGS. 5 and 6). In some embodiments, as discussed further below, multiple inflatable plug assemblies 10 are used in combination to seal a section of pipeline 14 for repair or maintenance purposes (e.g., repair of a catch basin, repair of a manhole). The pipeline 14 can be a water supply pipeline, a gas pipeline, a wastewater line or drainage pipeline, and the like. While the inflatable plug assembly 10 is illustrated in a pipeline 14 that is oriented generally horizontally, the inflatable plug assembly 10 may be utilized in alternatively orientated pipelines in other embodiments. The inflatable plug assembly 10 includes an inflatable member or plug 18, a flow-though fluid conduit 22, and a harness 26.

Figure 2:
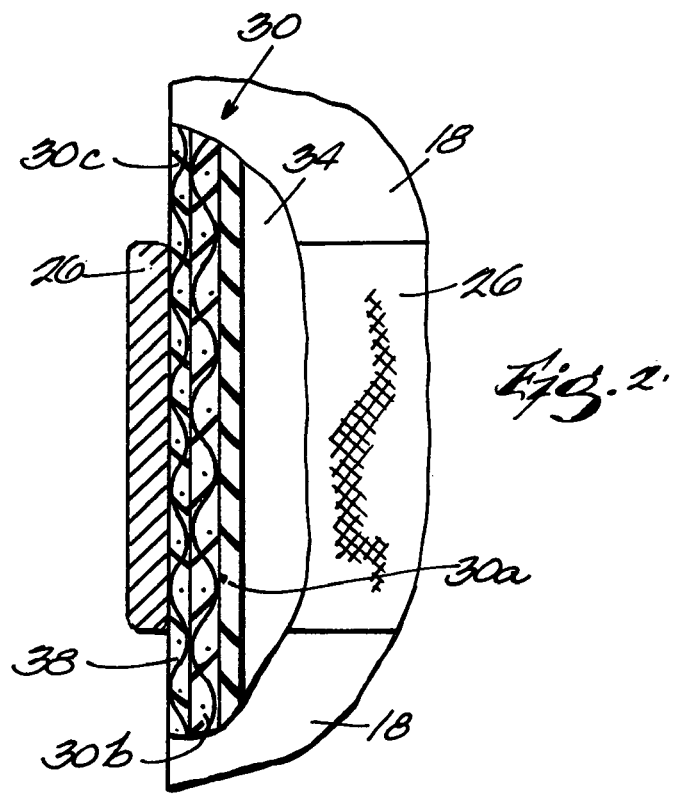
FIG. 2 is a partial sectional view of the flow-through inflatable plug assembly illustrated in FIG. 1 taken along line 2—2.

The inflatable member 18 is constructed of one or more layers of material 30 (FIG. 2). The material 30 defines an interior 34 of the inflatable member 18. The interior 34 is capable of receiving a pressurized fluid (e.g., air, water). The material 30 has adequate strength to retain the pressurized fluid in the interior 34. As discussed further below, the harness 26 may provide added support to the material 30 for retaining the pressurized fluid. The material 30 also defines an outer surface 38 of the inflatable member 18. As illustrated in FIGS. 1, 3, and 4, the outer surface 38 defines an aperture 42 in the inflatable member 18. A portion 38a of the outer surface 38 sealingly engages an inner surface or diameter of the pipeline 14 when the inflatable member 34 is operatively inflated in the pipeline 14 (FIGS. 5 and 6). Another portion 38b of the outer surface 38 sealingly engages at least a portion of the fluid conduit 22 when the inflatable member 18 is operatively inflated in the pipeline 14.

Generally, at least one of the layers of material 30 is a fluid-tight membrane 30a. In the illustrated embodiment, the fluid-tight membrane 30a is the innermost layer of material 30 (i.e., the layer of material 30 nearest the interior 34) and includes only a single layer of material 30. In other embodiments, the fluid-tight membrane 30a may include multiple layers of material and/or be alternatively orientated with respect to the other layers of material. When the fluid-tight membrane 30a is surrounded by one or more layers of material 30, material properties of the fluid-tight membrane 30a which emphasize wear resistance, puncture resistance, chemical compatibility, and ultra-violet radiation resistance may be compromised in favor of material properties which emphasize light-weight, thickness, flexibility, expandability, and cost-effectiveness. In the illustrated embodiment, the fluid-tight member 30a is a polyurethane bladder. In other embodiments, the fluid-tight membrane 30a is constructed of rubber or other elastomeric, fluid-impermeable materials.

A second layer of material 30b surrounds the fluid-tight membrane 30a. In some embodiments, the material 30b is constructed of a material having properties which emphasize flexibility, strength, and puncture resistance. The material 30b functions to provide protection to the fluid-tight membrane 30a. The material 30b prevents wear, and tearing or damage from sharp objects of the fluid-tight membrane 30a. The material 30b also limits the extent of inflation of the fluid-tight membrane 30a. Limiting the extent of inflation controls the size and shape of the inflated member 18 as it is inflated in the pipeline 14. In the illustrated embodiment, the material 30b is a polyurethane-coated ballistic nylon.

A third layer of material 30c surrounds the material 30b. In some embodiments, the material 30c is constructed of a material having properties which emphasize high-strength, wear resistance, puncture resistance, temperature resistance, chemical compatibility, and ultra-violet radiation resistance. Moreover, the outer surface of the material 30c exhibits a high coefficient of friction. In the illustrated embodiment, the outer surface of the material 30c is the outer surface 38 of the inflatable member 18. When the material 30c is in contact with the pipeline 14, the frictional engagement between the outer surface of the material 30c and the inside surface of the pipeline 14 is sufficient to resist thrust loads and pressures acting on the inflatable plug assembly 10. The size and shape of the flow-through inflatable member 18 may also affect the resistance of thrust loads and pressures acting on the inflatable plug assembly 10. In one embodiment, the length of the inflatable member 18 is at least two times the diameter of the inflatable member 18 when operatively inflated in the pipeline 14. In other embodiments, the inflatable member 18 is alternatively sized. The size and shape necessary to resist thrust loads and pressures often depends on the application in which the inflatable plug assembly 10 is utilized. Similarly, when the material 30c is in contact with the fluid conduit 22, the frictional engagement between the outer surface of the material 30c and the outside surface of the fluid conduit 22 prevents movement of the fluid conduit 22 with respect to the inflatable member 18. In the illustrated embodiment, the material 30c is a nylon-reinforced neoprene. In other embodiments, the material 30c is constructed of a high-strength fabric material (e.g., a treated cotton canvas material).

Other suitable materials for forming the inflatable member 18 are described in U.S. Pat. No. 5,901,752 and the subject matter of that patent is incorporated herein by reference. Although the inflatable member is illustrated having three layers of material 30, other embodiments may include fewer or more layers of materials and the functionality of some of the layers may be combined or separated.

As illustrated in FIGS. 1, 5, and 6, the harness 26 includes a structure having a plurality of interconnected strips. In other embodiments, the structure of the harness 26 may vary. The structure surrounds the inflatable member 18 and provides support thereto. The harness 26 limits the extent of inflation of the inflatable member 18. Limiting the extent of inflation controls the size and shape of the inflatable member 18 as it is inflated in the pipeline 14. The harness 26 is utilized to the position the inflatable member 18 in the pipeline 14. The harness 26 is also utilized to anchor the inflatable member 18 to the pipeline 14 and/or to other inflatable plug assemblies 10. In some embodiments, the harness 26 is constructed of material having properties which emphasize high-strength, wear resistance, puncture resistance, temperature resistance, chemical compatibility, and ultra-violet radiation resistance. Moreover, the harness 26 may exhibit a high coefficient of friction similar to that discussed above with respect to the third layer of material 30c. In the illustrated embodiment, the harness 26 is constructed of interconnected strips of high-strength fabric material.

As illustrated in FIG. 1, the inflatable member 18 includes a number of fluid ports 46. Each fluid port 46 extends through the material 30 and is in fluid communication with the interior 34. A fluid pressure source (not shown) can be connected to a fluid port 46 to force pressurized fluid through the fluid port 46 into the interior 34. The inflatable member 18 can thus be pressurized to cause inflation or expansion as needed. A pressure monitor (not shown) can also be connected to a fluid port 46 to monitor the fluid pressure in the interior 34 of the inflatable member 18. Such monitoring equipment can be utilized to ensure proper inflation of the inflatable member 18 for the current application. The fluid ports 46 can also provide for exhaust of fluid from the interior 34 when pressure inside the inflatable member 18 needs to be reduced (e.g., when repair of the pipeline 14 is completed).

In some embodiments, the inflatable member 18 is substantially toroidal (FIG. 1). As used herein, toroidal includes shapes generated by a closed curve (e.g., a substantially circular curve, an oblong curve, a substantially rectangular curve, a substantially symmetrical curve, a substantially asymmetrical curve) rotating about, but not intersecting or containing, an axis in its own plane. Accordingly, the aperture 42 is defined about the axis. In other embodiments, the inflatable member 18 is "donut-shaped". As used herein, "donut-shaped" includes shapes having an aperture defined therein. The shape may be of any configuration and the aperture may be through any portion of the shape (i.e., not necessarily through the center portion of the shape) and not necessarily along an axis.

The inflatable plug assembly 10 allows for the use of a multitude of flow-through fluid conduits 22. Any type of fluid conduit 22 that allows for the transfer of fluid through the fluid conduit 22 may be utilized. The aperture 42 of the inflatable member 18 is sized to receive fluid conduits 22 of varying diameters, shapes, lengths, and types. The fluid conduit 22 may include a rigid construction, a flexible construction, or a combination thereof. The flexibility of the material 30 allows for the outer surface 38b to conform to the outer surface or diameter of the fluid conduit 22 inserted in the aperture 42. For example, FIG. 3 illustrates a fluid conduit 22a sealingly captured in the aperture 42 of the inflatable member 18. FIG. 4 illustrates a fluid conduit 22b sealingly captured in the aperture 42 of the inflatable member 18. As illustrated, the outer diameter of the fluid conduit 22a is larger than the outer diameter of the fluid conduit 22b. As the inflatable member 18 is inflated, the outer surface 38b expands inward towards the fluid conduit 22 until at least a portion of the fluid conduit 22 is sealingly engaged.

The inflatable plug assemblies 10 shown in FIGS. 5 and 6 have multiple sections of fluid conduit 22 in fluid communication. In other embodiments, a single elongated fluid conduit 22 may be utilized to extend through the apertures 42 of each spaced apart inflatable member 18. The use of separate sections of fluid conduit 22 may facilitate installation of the inflatable plug assembly 10 into the pipeline 14. In embodiments where more than one fluid conduit 22 is utilized, the individual fluid conduits 22 may include any type of connector (e.g., flange connectors, threaded connectors) for connection to adjacent fluid conduits 22.

In some embodiments, multiple inflatable plug assemblies 10 are utilized in combination to seal a section of pipeline 14 for repair or maintenance purposes. To begin the sealing process, the fluid conduit 22 and the first and second inflatable members 18 are inserted through an opening in the pipeline 14. In most embodiments, first and second harnesses 26 are connected to the first and second inflatable members 18. The first and second inflatable members 18 are positioned in spaced apart relation in the pipeline 14 as to define a section of pipeline between the first and second inflatable members 18. The spaced apart inflatable members 18 are inflated, as discussed further below, so a first portion of the fluid conduit 22 is sealingly captured in the aperture 42 of the first inflatable member 18 and a second portion of the fluid conduit 22 is sealingly captured in the aperture 42 of the second inflatable member 18. As discussed above, the fluid conduit 22 can include any number of sections. Such capture causes the flow of fluid through the pipeline 14 to travel through the fluid conduit 22 when the first and second inflatable members 18 are operatively inflated in the pipeline 14. In one embodiment, as illustrated in FIG. 5, the flow of fluid through the fluid conduit 22 is driven by pressure differences on each side of the sealed section of pipeline 14. In another embodiment, a fluid pump 50 is utilized to enhance the flow of fluid through the fluid conduit 22. The fluid conduit 22 may be inserted into the aperture 42 either before or after insertion of the fluid conduit 22 and the inflatable members 18 into the pipeline 14. Similarly, the harness 26 may be connected to the inflatable member 18 at any time.

In some embodiments, multiple inflatable plug assemblies 10 are inflated from a single fluid pressure source. Common inflation may be useful when the pressure required in each inflatable plug assembly 10 is similar. In order to commonly inflate two inflatable plug assemblies 10, a first fluid port 46 of a first inflatable plug assembly 10 is connected to a fluid pressure source and a second fluid port of the first inflatable assembly 10 is connected to a fluid port 46 of a second inflatable plug assembly 10. In one embodiment, the second fluid port 46 of the first inflatable plug assembly 10 and the fluid port 46 of the second inflatable plug assembly 10 each face the section of the pipeline that is defined by the first and second flow-through inflatable plug assemblies 10. The harness 26 of each inflatable plug assembly 10 may be connected by a tensile member (e.g., a chain) to prevent movement of each inflatable plug assembly 10 with respect to the other inflatable plug assembly 10. A monitoring apparatus can be connected to a fluid port 46 of either inflatable plug assembly 10 to monitor the pressure in the interior 34 of each.

In some embodiments, multiple flow-through inflatable plug assemblies 10 are inflated from separate or independent pressure sources. Independent inflation may be useful in order to permit one of the two inflatable plug assemblies 10 to be inflated under greater pressure than the other of the inflatable plug assemblies 10.

In some embodiments, the sealed sections of pipeline 14 is evacuated to provide a suitable working environment. To perform such evacuation, a hose is placed through an opening in the pipeline 14 and placed in the lowest area in the sealed section of pipeline. The hose is then connected to an external pump and the sealed section of pipeline 14 is evacuated.

In some embodiments, the inflatable plug assembly 10 is utilized to plug a pipeline 10. For such operation, at least one end of the fluid conduit 22 is sealed to prevent the flow of fluid through the fluid conduit 22. When the inflatable member 18 is inflated as discussed above, the flow of fluid in the pipeline 14 is substantially prevented from traveling past or through the inflatable plug assembly 10.

The inflatable plug assembly 10 embodying the invention can be constructed of varying sizes depending upon the size of the pipeline 14 to be repaired or maintained. Generally, the inflatable plug assembly 10 is adapted to be operatively inflated in pipelines 14 having a range of diameters. A multitude of inflatable plug assemblies 10 may be utilized to seal pipelines 14 of widely varying diameters. The inflatable plug assembly 10 may include a diameter which ranges from several feet to approximately fifteen feet. The length of the inflatable plug assembly 10 can vary depending on the application.

Various features of the invention are set forth in the following claims.

What is claimed is:

1. A method of redirecting the flow of fluid through a pipeline, the method comprising:

providing a pipe;
providing an inflatable member having an inflated condition and a deflated condition, the inflatable member being substantially toroidal and including an inner wall defining an aperture extending through the inflatable member, the aperture, when the inflatable member is in the deflated condition, being larger than the pipe such that the pipe can be inserted into the aperture and through the inflatable member; and an outer wall;
inserting the pipe within the aperture when the inflatable member is in the deflated condition such that the pipe extends the length of the inflatable member;
inserting the inflatable member in the pipeline;
inflating the inflatable member such that the inner wall sealingly engages at least a portion of the pipe and the outer wall sealingly engages an inside diameter of the pipeline; and
a pipe redirecting the flow of fluid through the pipe including moving the flow of fluid through the pipe with a fluid pump.

2. A method of redirecting the flow of fluid through a pipeline, the method comprising:
providing a pipe;
providing an inflatable member having an inflated condition and a deflated condition, the inflatable member being substantially toroidal and including an inner wall defining an aperture extending through the inflatable member, the aperture, when the inflatable member is in the deflated condition, being larger than the pipe such that the pipe can be inserted into the aperture and through the inflatable member; and an outer wall;
inserting the pipe within the aperture when the inflatable member is in the deflated condition such that the pipe extends the length of the inflatable member;
inserting the inflatable member in the pipeline;
inflating the inflatable member such that the inner wall sealingly engages at least a portion of the pipe and the outer wall sealingly engages an inside diameter of the pipeline; and
redirecting the flow of fluid through the pipe;
providing a second inflatable member having an inflated condition and a deflated condition, the second inflatable member being substantially toroidal including an inner wall defining an aperture extending through the second inflatable member and an outer wall;
inserting the pipe within the aperture of the second inflatable member such that the pipe extends the length of the second inflatable member;
inserting the second inflatable member in the pipeline so as to position the first and second inflatable members in spaced apart relation in the pipeline as to define a section of pipeline between the first and second inflatable members; and
inflating the second inflatable member such that the inner wall of the second inflatable member sealingly engages at least a portion of the pipe and the outer wall of the second inflatable member sealingly engages an inside diameter of the pipeline, the pipe being otherwise uncoupled to the second inflatable member in the inflated condition;
positioning a hose in the defined section of pipeline and connecting the hose to a pump to remove fluid from the defined section of pipeline.

\* \* \* \* \*